Feb. 2, 1960  A. W. TRONNIER  2,923,203
HIGH SPEED PHOTOGRAPHIC OBJECTIVE WITH LARGE FIELD OF VIEW
Filed April 17, 1958

INVENTOR
Albrecht Wilhelm Tronnier
BY
ATTORNEYS

United States Patent Office 2,923,203
Patented Feb. 2, 1960

2,923,203
HIGH SPEED PHOTOGRAPHIC OBJECTIVE WITH LARGE FIELD OF VIEW

Albrecht Wilhelm Tronnier, New York, N.Y., assignor to Farrand Optical Co., Inc., New York, N.Y., a corporation of New York Application April 17, 1958, Serial No. 729,144

10 Claims. (Cl. 88—57)

The present invention relates to high speed photographic objectives whose relative aperture lies between 1:1.7 and 1:2.4 and whose useful total field angle amounts to some 56 to 66 degrees.

Attempts have already been made to produce photographic objectives possessing both high speed and wide field. Hitherto however it was in such attempts however necessary to accept a curved image surface, or else it was sought to achieve a satisfactory field flattening by the provision of one or more supplementary divergent field lenses in the vicinity of the image plane. Such arrangements of field lenses are however afflicted with substantial disadvantages inasmuch as they not only increase the number of lens elements of the objective but also introduce constructional difficulties, for example in the centering of the various elements. In many cases these constructional defects prove in practive insurmountable and have rendered such objectives unusable.

High performance objectives of the type above described but without supplementary field lenses have not hitherto been commercially available. The invention however provides such, and accordingly provides a substantial improvement to the practical photographic art.

The invention effects solution of the problem of providing lenses as above described, with a satisfactorily flat field, by a new disposition of the lens elements. On the long conjugate side the lens of the invention possesses a front assembly presenting its most strongly divergent concave surface to the diaphragm space. On the short conjugate side, between the diaphragm and the image plane, the lens of the invention possesses an assembly of Gaussian type including two or more elements.

Figure 1:
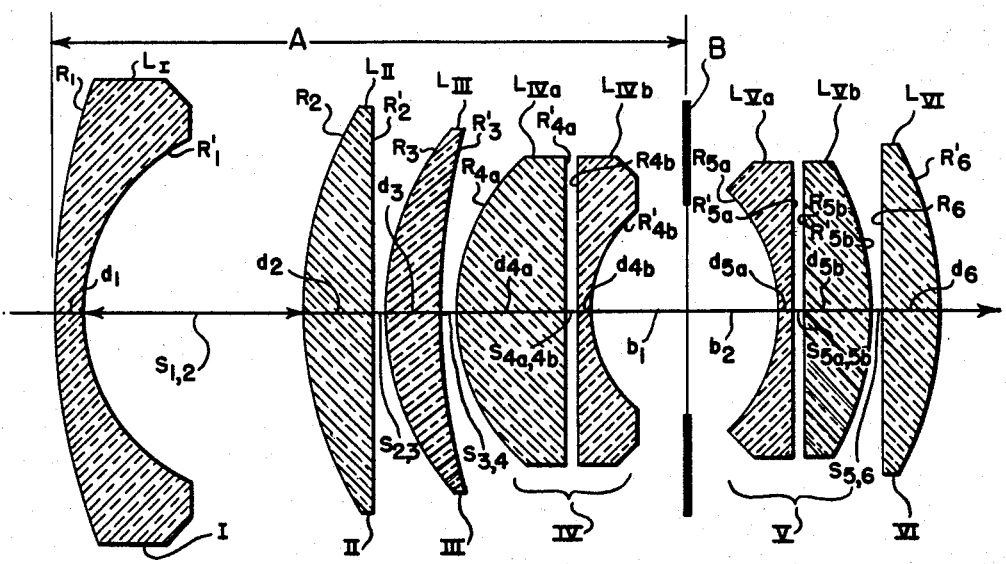
Figure 2:
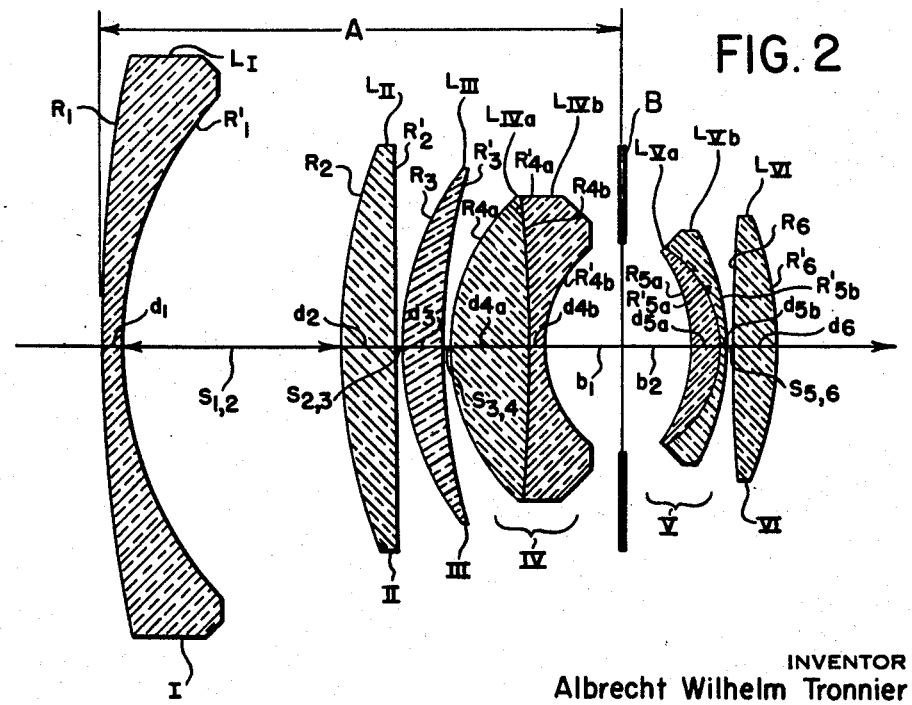

The invention will be further described with reference to the accompanying drawings in which Figs. 1 and 2 are axial sections through two embodiments of the lens of the invention.

The lens of the invention comprises six components, identified in each of Figs. 1 and 2 by means of the reference characters I to VI, beginning at the long conjugate side of the lens. The radii of curvature of the front surfaces of the elements (i.e. the surfaces presented to the long conjugate side of the system) are identified by the letter R with Arabic subscripts corresponding to the Roman identification of those elements above discussed, and the radii of curvature of the rear surfaces of the elements are identified by the symbol R' with similar subscripts. The axial thickness of the elements are identified by the letter $d$ with subscripts which identify the elements in the same fashion, and the axial spacings of the elements are identified by the letter $s$ with double subscripts identifying the elements preceding and following such spacings. The diaphragm position is indicated by division of the spacing $s_{4,5}$ in which it is located into portions $b_1$ and $b_2$ preceding and following the diaphragm. The equivalent focal length of the lens is denoted $f$, and the spacing of the front surface of the first element $L_I$ from the diaphragm position is denoted A. Components I, II, III and VI include one lens element each, identified in the drawings as $L_I$, $L_{II}$, $L_{III}$ and $L_{VI}$ respectively. Components IV and V each comprise, in the embodiments illustrated, two lens elements, those of component IV bearing reference characters $L_{IVa}$ and $L_{IVb}$ while those of component V bear reference characters $L_{Va}$ and $L_{Vb}$.

Components I to IV make up the front assembly preceding the diaphragm, which is shown at B and components V and VI make up the rear assembly, disposed behind the diaphragm.

The first component I is of negative power and of unequal surface curvatures, and is preferably of meniscus shape. It is disposed at a distance A from the diaphragm B of from 0.7 to 1.4 times the equivalent focal length $f$. Component I is disposed with its concave surface $R'_1$ concave toward the diaphragm. The vertex of this surface is spaced from the second component II at a distance $s_{1,2}$ of from ⅓ to ⅔ the equivalent focal length $f$. Component II is one of three other components II, III, IV all preceding the diaphragm position. Of these three the components II and III are convergent and of these at least one is of meniscus shape. The strongly convergent front surfaces of components II and III are concave toward the diaphragm. The negative meniscus component IV, preferably of two elements as shown, completes the front assembly, and likewise has its two outer surfaces concave toward the diaphragm.

According to a further feature of the invention the components I to IV of the front assembly possess respectively surface power sums $\phi_I$ to $\phi_{IV}$ which are related to the equivalent total power $\Phi$ of the objective as follows:

$$0.4\Phi < -\phi_I < 0.8\Phi$$
$$0.3\Phi < \phi_{II} < 0.6\Phi$$
$$0.45\Phi < \phi_{III} < 0.9\Phi$$
$$0.65\Phi < -\phi_{IV} < 1.3\Phi$$

In these inequalities the powers $\phi_I$ to $\phi_{IV}$ of the components I to IV are obtained by summing the powers of the exterior surfaces of those components respectively. In the notation to be used herein, the sum of the powers of the two surfaces of an element is indicated by the symbol $\phi$ with a Roman subscript identifying the element to which it belongs while the power of a single surface is designated by the symbol $\phi$ with an Arabic subscript identifying the element to which the surface belongs, an unprimed value of $\phi$ referring to a front surface and a primed value of $\phi$ referring to a rear surface. In addition, reference will be made to component powers referring, in the case of the single element components I, II, III and VI to the sums of the surface powers of the elements which make up those components respectively and, in the case of the two element components IV and V, to the sums of the powers of their exterior surfaces.

The previously stated relation between the equivalent focal length $f$ and the spacing A from the vertex of the rear surface of component I to the diaphragm position may be stated algebraically as follows:

$$0.7f < A < 1.4f$$

The relation between the spacing $s_{1,2}$ of components I and II and the equivalent focal length $f$ may likewise be written as follows:

$$0.333f < s_{1,2} < 0.667f$$

The two convergent components II and III and the negative component IV follow the component I as the remaining components of the front assembly.

The rear assembly components V and VI respectively possess surface power sums $\phi_V$ and $\phi_{VI}$ related to the total power $\Phi$ as follows:

$$0.25\Phi < -\phi_V < 0.75\Phi$$
$$0.67\Phi < \phi_{VI} < 1.50\Phi$$

The zontal variations in the aperture abberations of the lens of the invention can be favorably influenced in relatively simple fashion by appropriate dimensioning of the adjacent rear surface of component II and front surface of component III. According to the invention, there is given to this pair of surfaces a surface power sum corresponding, in order of magnitude, to the surface power sum of the last, convergent component VI on the image side of the system. This relation is according to the invention fixed as follows:

$$0.67\Phi < \phi_{s_{2,3}} < 1.50\Phi$$

In this relation $\phi_{s_{2,3}}$ represents the sum of the power of the rear surface of component II and of the power of the front surface component III, $s_{2,3}$ identifying the spacing of lens element $L_{II}$ and $L_{III}$. $\phi_{s_{2,3}}$ therefore refers to the power of the air lens constituted by the air space between elements $L_{II}$ and $L_{III}$. At any surface of radius R the power $\phi$ is given by the difference between the index of refraction $n'$ of the medium preceding the surface and the index of refraction $n$ of the medium following the surface divided by the radius of the curvature of the surface, thus, according to the usual formula $$\phi = (n' - n) : R$$

The invention further provides a particularly fine image formation in the lateral portions of the field by appropriate distribution of power among the optically strong surfaces of the four components of the front assembly. According to this further feature of the invention, the sum $(\phi_2 + \phi_3)$ of the powers of the front surfaces of the convergent components II and III lies between 1.7 and 2.8 times the absolute value of the power of the divergent concave rear surface $R'_1$ of the first component I. Algebraically:

$$1.7|\phi'_1| < (\phi_2 + \phi_3) < 2.8|\phi'_1|$$

In the foregoing, $|\phi'_1|$ designates the absolute value of the quantity $\phi'_1$. Further, the sum $(\phi_2 + \phi_3 + \phi_4)$ of the powers of the front surfaces of components II, III and IV is made to lie between 3.4 and 5.6 times the absolute value of the power $\phi'_1$ of the divergent rear surface of component I, which is concave toward the diaphragm. Algebraically:

$$2.8|\phi'_1| < (\phi_2 + \phi_3 + \phi_4) < 5.6|\phi'_1|$$

Three examples of the lenses of the invention will now be given, with data therefor in tabular form. The general form of the lens of Example 1 is shown in Fig. 1 and that of Examples 2 and 3 in Fig. 2. The glasses employed are identified by their indices of refraction $n$ for the yellow $d$ line of helium whose wave length $\lambda$ is 5876 Angstroms, and by their Abbe numbers $\nu$. In each of the following examples there is further given the equivalent focal length $f$ and the last intersection distance $p'_0$ on the image side of the system, for an infinitely distant object. The useful relative aperture is also given and so is the field angle $2\omega_0$ on the object side of the system. The objectives of these examples are, in accordance with the essential properties of the lens of the invention, provided with anastigmatic field flattening and consequently require no supplementary field flattening field lenses.

The first example to be considered is a lens of relative aperture $f/2.1$, whose total field angle $2\omega_0$ is 58°. For an equivalent focal length $f$ of 100 mm. and corresponding total power $\Phi$ of 10 diopters, the general distribution of powers in this lens is as follows:

$$\phi_I = -5.8 \text{ dptr.}$$
$$\phi_{II} = +4.6 \text{ dptr.}$$
$$\phi_{III} = +6.6 \text{ dptr.}$$
$$\phi_{IV} = -9.4 \text{ dptr.}$$
$$\phi_V = -3.9 \text{ dptr.}$$
$$\phi_{VI} = +9.3 \text{ dptr.}$$

In this lens the distance A from the front surface of component I to the diaphragm position is $0.99 f$ and the spacing $s_{1,2}$ of components I and II is $0.45f$.

While the foregoing table gives the general distribution of powers among the lens components, a more accurately stated distribution which shows the apportionment of the powers of components IV and V among their two elements $L_{IVa}$ and $L_{IVb}$ and $L_{Va}$ and $L_{Vb}$ is as follows:

TABLE 2

$\phi_I = -5.85$ dptr.
$\phi_{II} = +4.63$ dptr.
$\phi_{III} = +6.63$ dptr.
$\phi_{IV} = \phi_{IVa} + \phi_{IVb} = +18.90 - 28.28 = -9.38$ dptr.
$\phi_V = \phi_{Va} + \phi_{Vb} = +7.86 - 11.65 = -3.90$ dptr.
$\phi_{VI} = +9.32$ dptr.

Apportionment of the powers of the eight elements given in the last table between their individual surfaces gives for the lens of Example 1 the following distribution of individual surface powers (again assuming $\Phi = 10$ dptr.):

TABLE 3

| | |
|---|---|
| $\phi_1 = +1.79$ dptr. | $\phi_I = -5.85$ dptr. |
| $\phi'_1 = -7.64$ dptr. | |
| $\phi_2 = +5.25$ dptr. | $\phi_{II} = +4.63$ dptr. |
| $\phi'_2 = -0.62$ dptr. | |
| $\phi_3 = +11.94$ dptr. | $\phi_{III} = +6.63$ dptr. |
| $\phi'_3 = -5.31$ dptr. | |
| $\phi_{4a} = +17.03$ dptr. | |
| $\phi'_{4a} = +1.87$ dptr. | $\phi_{IV} = -9.38$ dptr. |
| $\phi_{4b} = -1.80$ dptr. | |
| $\phi'_{4b} = -26.48$ dptr. | |
| $\phi_{5a} = -17.26$ dptr. | |
| $\phi'_{5a} = +25.12$ dptr. | $\phi_V = -3.90$ dptr. |
| $\phi_{5b} = -24.18$ dptr. | |
| $\phi'_{5b} = +12.42$ dptr. | |
| $\phi_6 = +1.98$ dptr. | $\phi_{VI} = +9.32$ dptr. |
| $\phi'_6 = +7.34$ dptr. | |

There may be used for the eight elements of the lens of Example 1 commercially available glasses having respectively indices as follows:

TABLE 4

$n_1 = 1.56$ (low index dense crown)
$n_2 = 1.56$ (medium barium glass)
$n_3 = 1.67$ (dense barium flint)
$n_{4a} = 1.68$ (barium lanthanum crown)
$n_{4b} = 1.65$ (normal dense flint)
$n_{5a} = 1.55$ (medium phosphate glass)
$n_{5b} = 1.63$ (double light flint)
$n_6 = 1.50$ (light phosphate crown)

With these glasses and with appropriate lens thicknesses, the data for the lens of the first example is as follows (rewritten for an equivalent focal length $f$ of 1 meter):

TABLE 5

[Linear dimensions in meters.]

Relative aperture: $f/2.1$
Total field angle: $2\omega_0 = 58°$
Equivalent focal length: $f=1$ meter
Equivalent total power: $\Phi=1$ diopter
Diaphragm position: 0.154 meters from element $L_{Vb}$

| Component | Element | Radii | Thickness $d$ or Spacing $s$ | Index of Refraction $n$ |
|---|---|---|---|---|
| I | $L_I$ | $R_1 = +3.1$ m. | $d_1 = 0.05$ m. | $n_1 = 1.56$ |
|   |   | $R'_1 = +0.7$ m. | $s_{1,2} = 0.45$ m. |   |
| II | $L_{II}$ | $R_2 = +1.0$ m. | $d_2 = 0.07$ m. | $n_2 = 1.56$ |
|    |          | $R'_2 = +9.0$ m. | $s_{2,3} = 0.01$ m. |   |
| III | $L_{III}$ | $R_3 = +0.56$ m. | $d_3 = 0.08$ m. | $n_3 = 1.67$ |
|     |           | $R'_3 = +1.26$ m. | $s_{3,4} = 0.01$ m. |   |
| IV | $L_{IVa}$ | $R_{4a} = +0.4$ m. | $d_{4a} = 0.15$ m. | $n_{4a} = 1.68$ |
|    |           | $R'_{4a} = -3.6$ m. | $s_{4a,4b} = 0$ (Cemented) |   |
|    | $L_{IVb}$ | $R_{4b} = -3.6$ m. | $d_{4b} = 0.02$ m. | $n_{4b} = 1.65$ |
|    |           | $R'_{4b} = +0.25$ m. | $s_{4,5} = 0.285$ m. |   |
| V  | $L_{Va}$ | $R_{5a} = -0.32$ m. | $d_{5a} = 0.06$ m. | $n_{5a} = 1.55$ |
|    |          | $R'_{5a} = -0.22$ m. | $s_{5a,5b} = 0$ (Cemented) |   |
|    | $L_{Vb}$ | $R_{5b} = -0.22$ m. | $d_{5b} = 0.02$ m. | $n_{5b} = 1.53$ |
|    |          | $R'_{5b} = -0.43$ m. | $s_{5,6} = 0.01$ m. |   |
| VI | $L_{VI}$ | $R_6 = +2.5$ m. | $d_6 = 0.08$ m. | $n_6 = 1.50$ |
|    |          | $R'_6 = -0.69$ m. |   |   |

The foregoing Table 5 gives data for the lens of Example 1 with third order corrections included. Modification of this data to the highly corrected state contemplated and permitted by the invention gives the following data for the lens of that example, according to the invention:

TABLE 6

[Linear dimensions in meters.]

Relative aperture: $f/2.1$
Total field angle: $2\omega_0 = 58°$
Equivalent focal length: $f=1$ meter
Equivalent total power: $\Phi=1$ diopter
Diaphragm position: 0.15411 meters behind element $L_{IVb}$
Short conjugate side intersection distance for object at infinity: $p'_0 = 0.71246$ meters

| Component | Element | Radii | Thickness $d$ or Spacing $s$ | Index of Refraction $n$ | Abbe number $\nu$ |
|---|---|---|---|---|---|
| I | $L_I$ | $R_1 = +3.1291$ m. | $d_1 = 0.04957$ m. | $n_1 = 1.5596$ | $\nu_1 = 61.2$ |
|   |       | $R'_1 = +0.7323$ m. | $s_{1,2} = 0.44570$ m. |   |   |
| II | $L_{II}$ | $R_2 = +1.0698$ m. | $d_2 = 0.07511$ m. | $n_2 = 1.5625$ | $\nu_2 = 50.9$ |
|    |          | $R'_2 = +9.0126$ m. | $s_{2,3} = 0.00469$ m. |   |   |
| III | $L_{III}$ | $R_3 = +0.5610$ m. | $d_3 = 0.08675$ m. | $n_3 = 1.6700$ | $\nu_3 = 47.2$ |
|     |           | $R'_3 = +1.2604$ m. | $s_{3,4} = 0.00225$ m. |   |   |
| IV | $L_{IVa}$ | $R_{4a} = +0.3981$ m. | $d_{4a} = 0.15397$ m. | $n_{4a} = 1.6779$ | $\nu_{4a} = 55.5$ |
|    |           | $R'_{4a} = -3.6144$ m. | $s_{4a,4b} = 0$ (Cemented) |   |   |
|    | $L_{IVb}$ | $R_{4b} = -3.6144$ m. | $d_{4b} = 0.02159$ m. | $n_{4b} = 1.6490$ | $\nu_{4b} = 33.8$ |
|    |           | $R'_{4b} = +0.2450$ m. | $s_{4,5} = 0.28540$ m. |   |   |
| V  | $L_{Va}$ | $R_{5a} = -0.3200$ m. | $d_{5a} = 0.05915$ m. | $n_{5a} = 1.5523$ | $\nu_{5a} = 63.5$ |
|    |          | $R'_{5a} = -0.2199$ m. | $s_{5a,5b} = 0$ (Cemented) |   |   |
|    | $L_{Vb}$ | $R_{5b} = -0.2199$ m. | $d_{5b} = 0.01690$ m. | $n_{5b} = 1.5317$ | $\nu_{5b} = 48.9$ |
|    |          | $R'_{5b} = -0.4281$ m. | $s_{5,6} = 0.00967$ m. |   |   |
| VI | $L_{VI}$ | $R_6 = +2.5442$ m. | $d_6 = 0.07511$ m. | $n_6 = 1.5038$ | $\nu_6 = 66.7$ |
|    |          | $R'_6 = -0.6863$ m. |   |   |   |

The constructional form of the lens of the invention may be symbolically written as $$-U+U+M-D \text{ diaphragm } -D+U$$

in which U represents a component of unequal exterior surface curvatures, M a meniscus component and D a doublet, and in which the plus or minus sign refers to the convergent or divergent power of the component. The negative meniscus component V of Gaussian type adjacent the diaphragm can be constructed in the usual manner as a divergent doublet whose negative element is adjacent the diaphragm, as shown in Fig. 1. Alternatively as shown in Fig. 2, this doublet can be arranged with its convergent element adjacent the diaphragm and with its negative element remote from the diaphragm, enclosed by two positive elements. This latter arrangement makes possible for the first time the use of glasses of low index even in wide angle objectives of high speed, the use of such glasses having been hitherto limited either to wide angle lenses of low speed or to high speed lenses of narrow field angle. Consistently with the invention moreover the performance of the lens described may be increased by the use of high instead of low index glasses, for either greater speed or improved correction or wider field.

Example 2

TABLE 7

[Linear dimensions in millimeters.]

Relative aperture: $f/2.0$
Total field angle: $2\omega_0 = 61°$
Equivalent focal length: $f = 100$ mm.
Equivalent total power: $\Phi = 10.0$ diopters
Image side intersection distance for infinite object: $p'_0 = 71.2426$ mm.
Diaphragm position: 15.6490 mm. behind $L_{IVb}$

| Component | Element | Radii | Thickness $d$ or Spacing $s$ | Index of refraction $n$ | Abbe number $\nu$ |
|---|---|---|---|---|---|
| I | $L_I$ | $R_1 = +314.204$ mm. | $d_1 = 4.9840$ mm. | $n_1 = 1.56017$ | $\nu_1 = 61.00$ |
| | | $R'_1 = +73.4716$ mm. | $s_{1,2} = 44.7510$ mm. | | |
| II | $L_{II}$ | $R_2 = +107.505$ mm. | $d_2 = 7.9429$ mm. | $n_2 = 1.56296$ | $\nu_2 = 50.90$ |
| | | $R'_2 = +911.589$ mm. | $s_{2,3} = 0.2367$ mm. | | |
| III | $L_{III}$ | $R_3 = +56.3365$ mm. | $d_3 = 8.9423$ mm. | $n_3 = 1.67050$ | $\nu_3 = 47.59$ |
| | | $R'_3 = +126.560$ mm. | $s_{3,4} = 0.1315$ mm. | | |
| IV | $L_{IVa}$ | $R_{4a} = +39.9774$ mm. | $d_{4a} = 14.9126$ mm. | $n_{4a} = 1.67811$ | $\nu_{4a} = 55.58$ |
| | | $R'_{4a} = -364.005$ mm. | $s_{4a,4b} = 0$ | | |
| | $L_{IVb}$ | $R_{4b} = -365.005$ mm. | $d_{4b} = 2.6564$ mm. | $n_{4b} = 1.64838$ | $\nu_{4b} = 33.86$ |
| | | $R'_{4b} = +24.5256$ mm. | $s_{4,5} = 28.6548$ mm. | | |
| V | $L_{Va}$ | $R_{5a} = -32.1529$ mm. | $d_{5a} = 5.9440$ mm. | $n_{5a} = 1.55262$ | $\nu_{5a} = 63.30$ |
| | | $R'_{5a} = -21.9218$ mm. | $s_{5a,5b} = 0$ | | |
| | $L_{Vb}$ | $R_{5b} = -21.9218$ mm. | $d_{5b} = 1.6964$ mm. | $n_{5b} = 1.53232$ | $\nu_{5b} = 48.90$ |
| | | $R'_{5b} = -42.9625$ mm. | $s_{5,6} = 0.2236$ mm. | | |
| VI | $L_{VI}$ | $R_6 = +259.458$ mm. | $d_6 = 9.0344$ mm. | $n_6 = 1.50476$ | $\nu_6 = 66.94$ |
| | | $R'_6 = -67.8563$ mm. | | | |

The lens of Example 2 possesses the following surface, element and component powers:

TABLE 8

| | |
|---|---|
| $\phi_1 = + 1.7828237$ dptr. | $\phi_I = - 5.8414841$ dptr. |
| $\phi'_1 = - 7.6243078$ dptr. | |
| $\phi_2 = + 5.2365954$ dptr. | $\phi_{II} = + 4.6190367$ dptr. |
| $\phi'_2 = - 0.6175587$ dptr. | |
| $\phi_3 = +11.9016881$ dptr. | $\phi_{III} = + 6.6038045$ dptr. |
| $\phi'_3 = - 5.2978836$ dptr. | |
| $\phi_{4a} = +16.9623418$ dptr. | $\phi_{IVa} = +18.8252579$ dptr. |
| $\phi'_{4a} = + 1.8629161$ dptr. | $\phi_{IV} = - 9.3928626$ dptr. |
| $\phi_{4b} = - 1.7812413$ dptr. | $\phi_{IVb} = -28.2181105$ dptr. |
| $\phi'_{4b} = -26.4368692$ dptr. | |
| $\phi_{5a} = -17.1872730$ dptr. | $\phi_{Va} = + 8.0214153$ dptr. |
| $\phi'_{5a} = +25.2086883$ dptr. | $\phi_V = - 3.8709239$ dptr. |
| $\phi_{5b} = -24.2826698$ dptr. | $\phi_{Vb} = -11.8923392$ dptr. |
| $\phi'_{5b} = +12.3903306$ dptr. | |
| $\phi_6 = + 1.9454366$ dptr. | $\phi_{VI} = + 9.3840926$ dptr. |
| $\phi'_6 = + 7.4386560$ dptr. | |

Example 3

In the Example 3 now to be given the components II and VI, which are the convergent components in the front and rear assemblies respectively farthest from the diaphragm, are provided with larger axial thicknesses, and this example shows a slight reduction of various surface powers. By these means the useable diameters of components II and VI can be made especially large so that even large cross-sections for the comatic bundles are enabled to pass through the objective with only slight vignetting. For purposes of comparison the choice of glasses used in Example 2 has been retained, and so has the relative aperture of the objective and its field angle.

With these points of departure the general distribution of powers in the lens of Example 3 has the following form (assuming a system equivalent power $\Phi$ of 10 diopters:

TABLE 9

| | |
|---|---|
| $\phi_1 = + 1.66$ dptr. | $\phi_I = -5.85$ dptr. |
| $\phi'_1 = - 7.51$ dptr. | |
| $\phi_2 = + 5.17$ dptr. | $\phi_{II} = +4.63$ dptr. |
| $\phi'_2 = - 0.54$ dptr. | |
| $\phi_3 = +11.92$ dptr. | $\phi_{III} = +6.62$ dptr. |
| $\phi'_3 = - 5.40$ dptr. | |
| $\phi_{(4a)} = +18.86$ dptr. | $\phi_{IV} = -9.41$ dptr. |
| $\phi_{(4b)} = -28.27$ dptr. | |
| $\phi_{(5a)} = + 8.03$ dptr. | $\phi_V = -3.88$ dptr. |
| $\phi_{(5b)} = -11.91$ dptr. | |
| $\phi_6 = + 1.95$ dptr. | $\phi_{VI} = +9.40$ dptr. |
| $\phi'_6 = + 7.45$ dptr. | |

To this distribution of powers among the individual lens components there corresponds the following data for the lens of Example 3:

TABLE 10

[Equivalent focal length $f=100$ mm.]

| Component | Element | Radii | Thickness d or Spacing s | Index of refraction n | Abbe number ν |
|---|---|---|---|---|---|
| I | $L_I$ | $R_1 = +3.4f$ $R'_1 = +0.75f$ | $d_1 = 0.05f$ $s_{1,2} = 0.45f$ | $n_1 = 1.56$ | $\nu_1 = 61$ |
| II | $L_{II}$ | $R_2 = +1.09f$ $R'_2 = +10.4f$ | $d_2 = 0.09f$ $s_{2,3} = 0.002f$ | $n_2 = 1.56$ | $\nu_2 = 51$ |
| III | $L_{III}$ | $R_3 = +0.56f$ $R'_3 = +1.26f$ | $d_3 = 0.09f$ $s_{3,4} = 0.001f$ | $n_3 = 1.67$ | $\nu_3 = 48$ |
| IV | $L_{IVa}$ | $R_{4a} = +0.40f$ $R'_{4a} = -3.6f$ | $d_{4a} = 0.15f$ $s_{4a,4b} = 0$ | $n_{4a} = 1.68$ | $\nu_{4a} = 56$ |
| | $L_{IVb}$ | $R_{4b} = -3.6f$ $R'_{4b} = +0.24f$ | $d_{4b} = 0.03f$ $s_{4,5} = 0.29f$ | $n_{4b} = 1.65$ | $\nu_{4b} = 34$ |
| V | $L_{Va}$ | $R_{5a} = -0.32f$ $R'_{5a} = -0.22f$ | $d_{5a} = 0.06f$ $s_{5a,5b} = 0$ | $n_{5a} = 1.55$ | $\nu_{5a} = 63$ |
| | $L_{Vb}$ | $R_{5b} = -0.22f$ $R'_{5b} = -0.43f$ | $d_{5b} = 0.02f$ $s_{5,6} = 0.002f$ | $n_{5b} = 1.53$ | $\nu_{5b} = 49$ |
| VI | $L_{VI}$ | $R_6 = +2.6f$ $R'_6 = -0.68f$ | $d_6 = 0.1f$ | $n_6 = 1.50$ | $\nu_6 = 67$ |

Diaphragm position: $0.16f$ behind $L_{IVb}$.

Upon introduction of fine corrections into the approximate data of the preceding Table 10 and with change of values to correspond with a focal length $f$ of 100 mm., the lens data assumes the following form (dimensions in mm.):

In the systems whose data are given in Table 11, the intersection distance on the image side amounts, for an infinitely distant objective, to $p'_0 = 70.9884$ mm.

The individual surface powers and the element and component powers of the lens systems whose data are

TABLE 11

| Component | Element | Radii | Thickness d or Spacing s | Index of refraction n | Abbe number ν |
|---|---|---|---|---|---|
| I | $L_I$ | $R_1 = +337.175$ mm. $R'_1 = +74.5996$ mm. | $d_1 = 4.9751$ mm. $s_{1,2} = 44.6705$ mm. | $n_1 = 1.56017$ | $\nu_1 = 61.00$ |
| II | $L_{II}$ | $R_2 = +108.979$ mm. $R'_2 = +1041.82$ mm. | $d_2 = 9.2413$ mm. $s_{2,3} = 0.2363$ mm. | $n_2 = 1.56296$ | $\nu_2 = 50.90$ |
| III | $L_{III}$ | $R_3 = +56.2352$ mm. $R'_3 = +126.332$ mm. | $d_3 = 8.9262$ mm. $s_{3,4} = 0.1313$ mm. | $n_3 = 1.67050$ | $\nu_3 = 47.59$ |
| IV | $L_{IVa}$ | $R_{4a} = +39.9055$ mm. $R'_{4a} = -363.350$ mm. | $d_{4a} = 14.8858$ mm. $s_{4a,4b} = 0$ | $n_{4a} = 1.67811$ | $\nu_{4a} = 55.58$ |
| | $L_{IVb}$ | $R_{4b} = -363.350$ mm. $R'_{4b} = +24.4815$ mm. | $d_{4b} = 2.6516$ mm. $s_{4,5} = 28.6333$ mm. | $n_{4b} = 1.64838$ | $\nu_{4b} = 33.86$ |
| V | $L_{Va}$ | $R_{5a} = -32.0950$ mm. $R'_{5a} = -21.8824$ mm. | $d_{5a} = 5.9333$ mm. $s_{5a,5b} = 0$ | $n_{5a} = 1.55262$ | $\nu_{5a} = 63.30$ |
| | $L_{Vb}$ | $R_{5b} = -21.8824$ mm. $R'_{5b} = -42.8853$ mm. | $d_{5b} = 1.6934$ mm. $s_{5,6} = 0.2232$ mm. | $n_{5b} = 1.53232$ | $\nu_{5b} = 48.90$ |
| VI | $L_{VI}$ | $R_6 = +258.992$ mm. $R'_6 = -67.7343$ mm. | $d_6 = 9.8845$ mm. | $n_6 = 1.50476$ | $\nu_6 = 66.94$ | given in Table 11 are given as multiples of the equivalent system power Φ in the following Table 12.

TABLE 12

| | |
|---|---|
| $\phi_1 = +0.166\ 136\ \Phi$ | $\phi_I = -0.584\ 766\ \Phi$ |
| $\phi'_1 = -0.750\ 902\ \Phi$ | |
| $\phi_2 = +0.516\ 578\ \Phi$ | $\phi_{II} = +0.462\ 542\ \Phi$ |
| $\phi'_2 = -0.054\ 036\ \Phi$ | |
| $\phi_3 = +1.192\ 313\ \Phi$ | $\phi_{III} = +0.661\ 570\ \Phi$ |
| $\phi'_3 = -0.530\ 743\ \Phi$ | |
| $\phi_{4a} = +1.699\ 290\ \Phi$ | $\phi_{(4a)} = +1.885\ 917\ \Phi$ |
| $\phi'_{4a} = +0.186\ 627\ \Phi$ | $\phi_{IV} = -0.940\ 978\ \Phi$ |
| $\phi_{4b} = -0.178\ 445\ \Phi$ | $\phi_{(4b)} = -2.826\ 895\ \Phi$ |
| $\phi'_{4b} = -2.648\ 450\ \Phi$ | |
| $\phi_{5a} = -1.721\ 824\ \Phi$ | $\phi_{(5a)} = +0.803\ 586\ \Phi$ |
| $\phi'_{5a} = +2.525\ 410\ \Phi$ | $\phi_V = -0.387\ 790\ \Phi$ |
| $\phi_{5b} = -2.432\ 641\ \Phi$ | $\phi_{(5b)} = -1.191\ 376\ \Phi$ |
| $\phi'_{5b} = +1.241\ 265\ \Phi$ | |
| $\phi_6 = +0.194\ 894\ \Phi$ | $\phi_{VI} = +0.940\ 100\ \Phi$ |
| $\phi'_6 = +0.745\ 206\ \Phi$ | |

$$\phi'_1+\phi_2=+1.138\ 277\ \Phi$$
$$\phi_2+\phi_3=+1.708\ 891\ \Phi$$
$$\phi_2+\phi_3+\phi_4=+3.408\ 181\ \Phi$$

I claim:
1. A high speed objective lens system comprising, from front to back and in front of the diaphragm position, a first negative component, said negative component having unequal surface curvatures and having its strongly divergent rear surface concave toward the rear, first and second positive components of which at least one is of meniscus shape and of which both have their convergent front surfaces concave toward the rear, and a second negative component, said second negative component being of meniscus shape and having both of its exterior surfaces concave toward the rear, and, behind the diaphragm position, a rear assembly of Gaussian type, said first negative component being spaced from the diaphragm position by from 0.7 to 1.4 times the equivalent focal length of the objective system, the spacing of said first negative and first positive components lying between one-third and two-thirds of said focal length, and the most strongly divergent surface of said front assembly being adjacent the diaphragm position.

2. An objective lens system according to claim 1 in which said second negative component comprises at least two elements.

3. An objective lens system according to claim 1 in which the sums $\phi_I$ to $\phi_{IV}$ of the powers of the exterior surfaces of the four components I to IV in front of the diaphragm position, numbered from front to back, are related to the equivalent power Φ of the system as follows:

$$0.4\Phi < -\phi_I < 0.8\Phi$$
$$0.3\Phi < \phi_{II} < 0.6\Phi$$
$$0.45\Phi < \phi_{III} < 0.9\Phi$$
$$0.65\Phi < -\phi_{IV} < 1.3\Phi$$

4. An objective lens system according to claim 3 in which the sum $\phi_{s2,3}$ of the powers of the rear surface of the first positive component II and of the front surface of the second positive component III is related to the equivalent power Φ of the system as follows:

$$0.67\Phi < \phi_{s2,3} < 1.50\Phi$$

5. An objective lens system according to claim 3 in which the sum $(\phi_2+\phi_3)$ of the powers of the front surfaces of said first and second positive components II and III is related to the absolute value of the power $\phi'_1$ of the rear surface of said first negative component I as follows:

$$1.7|\phi'_1| < (\phi_2+\phi_3) < 2.8|\phi'_1|$$

6. An objective lens system according to claim 5 in which the sum $(\phi_2+\phi_3+\phi_4)$ of the powers of the front surfaces of the first and second positive components II and III and of the second negative component IV is related to the absolute value of the power of the rear surface of the first negative component I as follows:

$$2.8|\phi'_1| < (\phi_2+\phi_3+\phi_4) < 5.6|\phi'_1|$$

7. An objective lens system according to claim 3 in which the sums $\phi_I$ to $\phi_{VI}$ of the powers of the exterior surfaces of the six components I to VI respectively are related to the equivalent power Φ of the system substantially as follows:

$$\phi_I = -.58\ \Phi$$
$$\phi_{II} = +.46\ \Phi$$
$$\phi_{III} = +.66\ \Phi$$
$$\phi_{IV} = -.94\ \Phi$$
$$\phi_V = -.39\ \Phi$$
$$\phi_{VI} = +.93\ \Phi$$

8. An objective lens system according to claim 3 in which the sums $\phi_I$ to $\phi_{VI}$ of the powers of the exterior surfaces of the six components I to VI thereof respectively are related to the equivalent power Φ of the system substantially as follows:

$$\phi_I = -.585\ \Phi$$
$$\phi_{II} = +.463\ \Phi$$
$$\phi_{III} = +.663\ \Phi$$
$$\phi_{IV} = -.938\ \Phi$$
$$\phi_V = -.390\ \Phi$$
$$\phi_{VI} = +.932\ \Phi$$

and in which the sums $\phi_{IVa}$, $\phi_{IVb}$, $\phi_{Va}$, and $\phi_{Vb}$ of the front and rear elements of components IV and V respectively are related to the equivalent power Φ of the system substantially as follows:

$$\phi_{IVa} = +1.890\ \Phi$$
$$\phi_{IVb} = -2.828\ \Phi$$
$$\phi_{Va} = +\ .786\ \Phi$$
$$\phi_{Vb} = -1.176\ \Phi$$

9. A high speed objective lens system comprising, from front to back, a negative element $L_I$, first and second positive elements $L_{II}$ and $L_{III}$, a positive element $L_{IVa}$ and a negative element $L_{IVb}$, and, behind the diaphragm position, elements $L_{Va}$, $L_{Vb}$ and $L_{VI}$, said objective lens having an equivalent focal length $f$, said elements conforming substantially to the following conditions:

| Element | Radii | Thickness $d$ or Spacing $s$ | Index of Refraction $n$ |
|---|---|---|---|
| $L_I$ | $R_1 = +3.1f$ | $d_1 = 0.05f$ | $n_1 = 1.56$ |
| | $R'_1 = +0.7f$ | $s_{1,2} = 0.45f$ | |
| $L_{II}$ | $R_2 = +1.0f$ | $d_2 = 0.07f$ | $n_2 = 1.56$ |
| | $R'_2 = +9.0f$ | $s_{2,3} = 0.01f$ | |
| $L_{III}$ | $R_3 = +0.56f$ | $d_3 = 0.08f$ | $n_3 = 1.67$ |
| | $R'_3 = +1.26f$ | $s_{3,4} = 0.01f$ | |
| $L_{IVa}$ | $R_{4a} = +0.4f$ | $d_{4a} = 0.15f$ | $n_{4a} = 1.68$ |
| | $R'_{4a} = -3.6f$ | $s_{4a,4b} = 0$ (Cemented) | |
| $L_{IVb}$ | $R_{4b} = -3.6f$ | $d_{4b} = 0.02f$ | $n_{4b} = 1.65$ |
| | $R'_{4b} = +0.25f$ | $s_{4,5} = 0.285f$ | |
| $L_{Va}$ | $R_{5a} = -0.32f$ | $d_{5a} = 0.06f$ | $n_{5a} = 1.55$ |
| | $R'_{5a} = -0.22f$ | $s_{5a,5b} = 0$ (Cemented) | |
| $L_{Vb}$ | $R_{5b} = -0.22f$ | $d_{5b} = 0.02f$ | $n_{5b} = 1.53$ |
| | $R'_{5b} = -0.43f$ | $s_{5,6} = 0.01f$ | |
| $L_{VI}$ | $R_6 = +2.5f$ | $d_6 = 0.08f$ | $n_6 = 1.50$ |
| | $R'_6 = -0.69f$ | | |

10. A high speed objective lens system comprising, from front to back, a negative element $L_I$, first and second positive elements $L_{II}$ and $L_{III}$, a positive element $L_{IVa}$ and a negative element $L_{IVb}$ and, behind the diaphragm position elements $L_{Va}$, $L_{Vb}$ and $L_{VI}$ said objective lens having an equivalent focal length $f$, said elements conforming substantially to the following conditions:

| Element | Radii | Thickness $d$ or Spacing $s$ | Index of Refraction $n$ | Abbe number $\nu$ |
|---|---|---|---|---|
| $L_I$ | $R_1 = +3.1291$ m. $R'_1 = +0.7323$ m. | $d_1 = 0.04957$ m. $s_{1,2} = 0.44570$ m. | $n_1 = 1.5596$ | $\nu_1 = 61.2$ |
| $L_{II}$ | $R_2 = +1.0698$ m. $R'_2 = +9.0126$ m. | $d_2 = 0.07511$ m. $s_{2,3} = 0.00469$ m. | $n_2 = 1.5625$ | $\nu_2 = 50.9$ |
| $L_{III}$ | $R_3 = +0.5610$ m. $R'_3 = +1.2604$ m. | $d_3 = 0.08675$ m. $s_{3,4} = 0.00225$ m. | $n_3 = 1.6700$ | $\nu_3 = 47.2$ |
| $L_{IVa}$ | $R_{4a} = +0.3981$ m. $R'_{4a} = -3.6144$ m. | $d_{4a} = 0.15397$ m. $s_{4a,4b} = 0$ (Cemented) | $n_{4a} = 1.6779$ | $\nu_{4a} = 55.5$ |
| $L_{IVb}$ | $R_{4b} = -3.6144$ m. $R'_{4b} = +0.2450$ m. | $d_{4b} = 0.02159$ m. $s_{4,5} = 0.28540$ m. | $n_{4b} = 1.6490$ | $\nu_{4b} = 33.8$ |
| $L_{Va}$ | $R_{5a} = -0.3200$ m. $R'_{5a} = -0.2199$ m. | $d_{5a} = 0.05915$ m. $s_{5a,5b} = 0$ (Cemented) | $n_{5a} = 1.5523$ | $\nu_{5a} = 63.5$ |
| $L_{Vb}$ | $R_{5b} = -0.2199$ m. $R'_{5b} = -0.4281$ m. | $d_{5b} = 0.01690$ m. $s_{5,6} = 0.00967$ m. | $n_{5b} = 1.5317$ | $\nu_{5b} = 48.9$ |
| $L_{VI}$ | $R_6 = +2.5442$ m. $R'_6 = -0.6863$ m. | $d_6 = 0.07511$ m. | $n_6 = 1.5038$ | $\nu_6 = 66.7$ |

References Cited in the file of this patent

UNITED STATES PATENTS

| | | |
|---|---|---|
| 1,934,561 | Rayton | Nov. 17, 1933 |
| 2,184,018 | Ort | Dec. 19, 1939 |
| 2,317,790 | Mellor | Apr. 27, 1943 |
| 2,612,077 | Albrecht | Sept. 30, 1952 |
| 2,649,022 | Augeuieux | Aug. 18, 1953 |
| 2,780,139 | Lange | Feb. 5, 1957 |
| 2,793,565 | Zollner et al. | May 28, 1957 |
| 2,824,494 | Klent | Feb. 25, 1958 |

FOREIGN PATENTS

| | | |
|---|---|---|
| 1,102,390 | France | May 4, 1955 |

UNITED STATES PATENT OFFICE
CERTIFICATE OF CORRECTION

Patent No. 2,923,203                          February 2, 1960

Albrecht Wilhelm Tronnier

It is hereby certified that error appears in the printed specification of the above numbered patent requiring correction and that the said Letters Patent should read as corrected below.

Column 4, line 71, Table 4, for "1.63" read -- 1.53 --; column 5, Table 6, sixth column thereof, third item, for "$\nu_2 = 47.2$" read -- $\nu_3 = 47.2$ --.

Signed and sealed this 26th day of July 1960.

(SEAL)
Attest:

KARL H. AXLINE                                        ROBERT C. WATSON
Attesting Officer                                     Commissioner of Patents